(12) United States Patent
Jang

(10) Patent No.: US 11,722,792 B2
(45) Date of Patent: Aug. 8, 2023

(54) IMAGE SENSING DEVICE

(71) Applicant: SK hynix Inc., Icheon-si (KR)

(72) Inventor: Jae Hyung Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/703,114

(22) Filed: Mar. 24, 2022

(65) Prior Publication Data
US 2022/0329744 A1 Oct. 13, 2022

(30) Foreign Application Priority Data

Apr. 12, 2021 (KR) .................. 10-2021-0046975

(51) Int. Cl.
*H04N 25/50* (2023.01)
*H04N 25/71* (2023.01)
*G06T 7/70* (2017.01)

(52) U.S. Cl.
CPC .............. *H04N 25/50* (2023.01); *G06T 7/70* (2017.01); *H04N 25/71* (2023.01)

(58) Field of Classification Search
CPC ........ H04N 25/50; H04N 25/71; H04N 25/70; H04N 25/705; H04N 23/54; H04N 25/766; G06T 7/70; G01S 7/4863; G01S 7/4865; G01S 7/4914; G01S 17/894; H01L 27/14643

See application file for complete search history.

(56) References Cited

U.S. PATENT DOCUMENTS

| | | | | |
|---|---|---|---|---|
| 10,636,831 B2 * | 4/2020 | Ebiko | ................. | H01L 27/1461 |
| 2017/0301708 A1 * | 10/2017 | Fotopoulou | ............. | H01L 31/11 |
| 2019/0025414 A1 * | 1/2019 | Van Der Tempel | ......................... H01L 27/14609 | |
| 2019/0252449 A1 * | 8/2019 | Ebiko | ............... | H01L 27/14643 |
| 2020/0382737 A1 * | 12/2020 | Kajiwara | ................ | G01S 17/89 |

FOREIGN PATENT DOCUMENTS

KR 20150020424 A 2/2015

* cited by examiner

*Primary Examiner* — Nhan T Tran
(74) *Attorney, Agent, or Firm* — Perkins Coie LLP

(57) ABSTRACT

An image sensing device is provided to include a pixel array comprising a first pixel group and a second pixel group, each pixel configured to sense a distance to a target object in response to modulated light that is incident on the pixel array; a first modulation driver configured to supply, to the first pixel group, a first modulation control signal and a second modulation control signal; and a second modulation driver configured to supply, to the second pixel group, a third modulation control signal and a fourth modulation control signal, wherein the first and second modulation drivers are independently controlled from each other such that at least one of the first modulation control signal, the second modulation control signal, the third modulation control signal, or the fourth modulation control signal has a phase difference from the modulated light.

20 Claims, 15 Drawing Sheets

IMAGE SENSING DEVICE

CROSS-REFERENCES TO RELATED APPLICATION

The present application claims priority under 35 U.S.C. § 119(a) to Korean application number 10-2021-0046975, filed on Apr. 12, 2021, in the Korean Intellectual Property Office, which is incorporated herein by reference in its entirety.

TECHNICAL FIELD

Various embodiments generally relate to an image sensing device for sensing the distance to a target object.

BACKGROUND

An image sensor refers to a device for capturing an image using the property of semiconductor that reacts to light. Recently, the development of computer industry and communication industry has increased the demand for advanced image sensors in various fields such as a smart phone, digital camera, game machine, IoT (Internet of Things), robot, security camera and medical micro camera.

The image sensors may be roughly divided into a CCD (Charge Coupled Device) image sensor and a CMOS (Complementary Metal Oxide Semiconductor) image sensor. The CCD image sensor generates less noise and has a higher image quality than the CMOS image sensor. However, the CMOS image sensor can be driven through a convenient method, and implemented through various scanning methods. Since the CMOS image sensor has a configuration in which a signal processing circuit can be integrated in a single chip, the CMOS image sensor can easily reduce the size of a product, and reduce power consumption. Furthermore, since the CMOS processing technology can be interchangeably used, the CMOS image sensor can be fabricated at low cost. Recently, more and more CMOS image sensing devices are used because the CMOS image sensing devices are more suitable for mobile devices.

SUMMARY

Various embodiments are directed to an image sensing device which includes ToF (Time of Flight) pixels capable of reducing power consumption.

In one aspect, an image sensing device is provided to include: a pixel array including a first pixel group and a second pixel group, each of which includes a plurality of pixels each configured to sense the distance to a target object; a first modulation driver configured to supply the first pixel group with a first modulation control signal and a second modulation control signal, each of which has a predetermined phase difference from modulated light; and a second modulation driver configured to supply the second pixel group with a third modulation control signal and a fourth modulation control signal, each of which has a predetermined phase difference from the modulated light. The first and second modulation drivers may be independently controlled.

In another aspect, an image sensing device is provided to include a pixel array comprising a first pixel group and a second pixel group, each of the first pixel group and the second pixel group including pixels each configured to sense a distance to a target object in response to modulated light that is incident on the pixel array; a first modulation driver communicatively coupled to the pixel array and configured to supply, to the first pixel group, a first modulation control signal and a second modulation control signal; and a second modulation driver communicatively coupled to the pixel array and configured to supply, to the second pixel group, a third modulation control signal and a fourth modulation control signal, wherein the first and second modulation drivers are independently controlled from each other such that at least one of the first modulation control signal, the second modulation control signal, the third modulation control signal, or the fourth modulation control signal has a phase difference from the modulated light.

In another aspect, an image sensing device is provided to include: a pixel array including a plurality of pixels each configured to sense the distance to a target object; a first modulation driver configured to supply the pixel array with a first modulation control signal and a second modulation control signal, each of which has a predetermined phase difference from modulated light; and a second modulation driver configured to supply the pixel array with a third modulation control signal and a fourth modulation control signal, each of which has a predetermined phase difference from the modulated light, wherein the first and second modulation drivers are activated at different times.

In another aspect, an image sensing device is provided to include a pixel array comprising a first pixel disposed in a first pixel group and a second pixel disposed in a second pixel group, each pixel configured to sense the distance to a target object by responding to incident light and producing photocharges and including a first detection structure and a second detection structure that are configured to capture the photocharges migrated by a current generated in the pixel array; a first modulation driver in communication with the pixel array and configured to supply a first modulation control signal and a second modulation control signal to the first detection structure and the second detection structure of the first pixel, respectively; and a second modulation driver in communication with the pixel array and configured to supply a third modulation control signal and a fourth modulation control signal to the first detection structure and the second detection structure of the second pixel, respectively, wherein at least two of the first to fourth modulation control signal have different phases from each other.

In accordance with the present embodiments, the image capturing apparatus can adaptively reduce power consumed by ToF pixels.

In addition it is possible to provide various effects which are directly or indirectly understood through this document

DETAILED DESCRIPTION

Hereafter, various embodiments of the present disclosure will be described with reference to the accompanying drawings.

The demand for a method for measuring a depth using an image sensor is rapidly increasing in various fields such as a security device, medical device, vehicle, game machine, VR/AR and mobile device. Representative examples of the method for measuring a depth may include a triangulation method, a ToF (Time of Flight) method and an interferometry method. Among the methods, the ToF method can be utilized in a wide range, has high processing speed, and can be implemented at low cost. Thus, the importance of the ToF method is rising.

The ToF method may be roughly divided into a direct method for measuring a distance by directly calculating a round trip time and an indirect method for measuring a distance using a phase difference, based on the common principle to measure a distance using emitted light and reflected and returned light. Since the direct method is suitable for a long distance, the direct method is usually used in a vehicle and the like. The indirect method suitable for a short distance is used for a game machine or mobile camera which requires high processing speed. The indirect method requires a simple circuit configuration and less memories, and can be implemented at relatively low cost.

A CAPD (Current-Assisted Photonic Demodulator), which is one of pixels operated through the indirect ToF method, applies a substrate voltage to detect electrons, which are generated in a pixel, using a majority current based on a voltage difference of an electric field. Since the majority current is used, the CAPD can rapidly detect electrons. Furthermore, since the CAPD can detect even electrons which are generated deeply from a light incident surface, the CAPD may be considered to have excellent efficiency.

Figure 1:
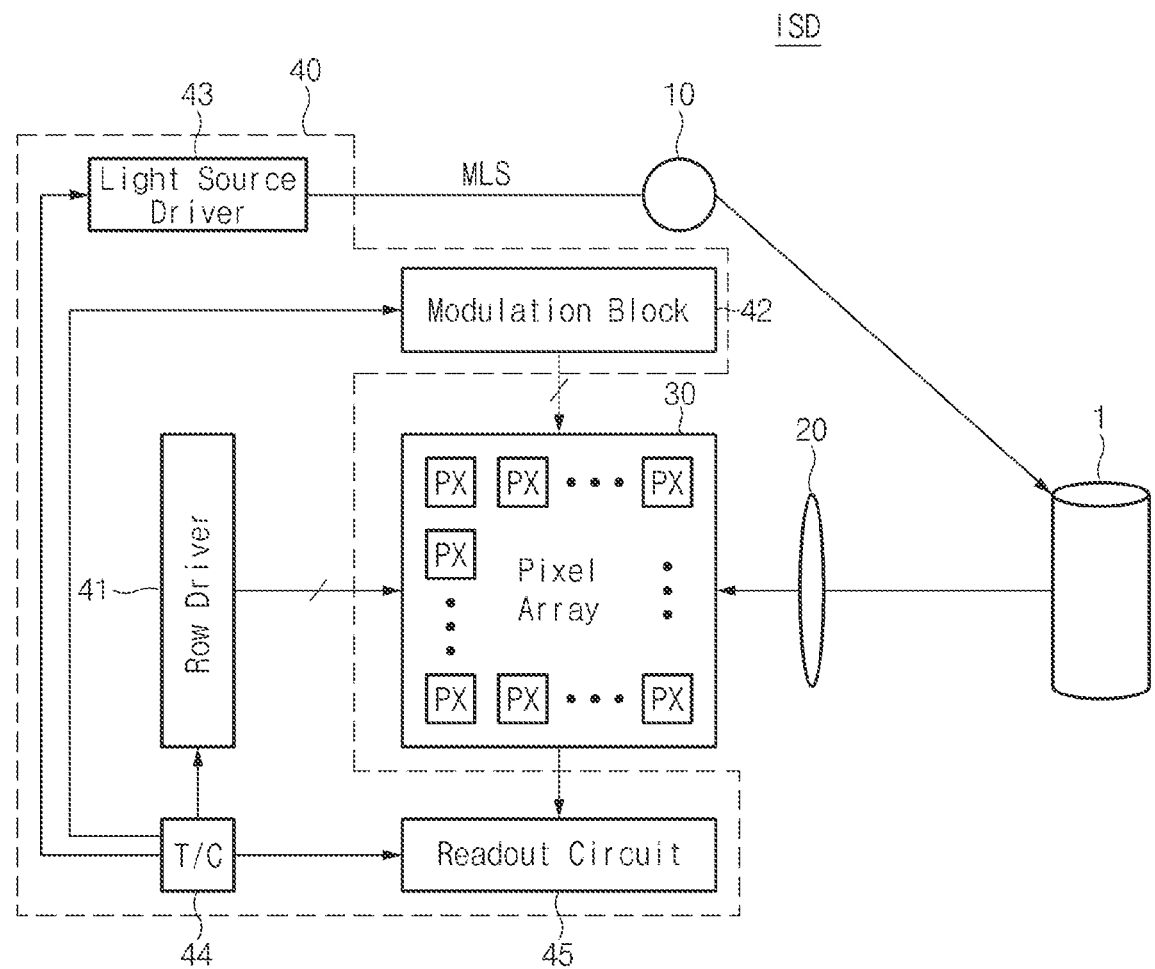
FIG. 1 is a configuration diagram schematically illustrating a configuration of an image sensing device in accordance with an embodiment.

FIG. 1 is a configuration diagram schematically illustrating a configuration of an image sensing device in accordance with an embodiment.

Referring to FIG. 1, an image sensing device ISD may measure the distance to a target object 1 using a ToF method. The ToF method may be divided into a direct ToF method and an indirect ToF method. The direct ToF method may indicate a method that measures the distance to the target object 1 by emitting light toward the target object 1 and measuring the time of flight (ToF) that the light travels from a light source of the ISD to the target object 1 and back to the ISD as reflected light from the target object arrives at the ISD where the distance is the light of speed multiplied by one half of the ToF. The indirect ToF method may indicate a method that emits modulated light toward the target object 1, senses light reflected and incident from the target object 1, and indirectly measures the distance between the image sensing device ISD and the target object 1 based on the phase difference between the modulated light and the reflected light. In the present embodiment, the case in which the image sensing device ISD uses the indirect ToF method will be taken as an example for description. However, the present embodiment is not limited thereto. Furthermore, the target object 1 does not indicate only one independent object, but may indicate a scene which is captured by the image sensing device ISD.

The image sensing device ISD may include a light source 10, a lens module 20, a pixel array 30 and a control block 40.

The light source 10 emits light onto the target object 1 in response to a modulated light signal MLS provided from the control block 40. Examples of the light source 10 may include an LD (Laser Diode) or LED (Light Emitting Diode), an NIR (Near Infrared Laser), a point light source, a monochromatic illumination source and a combination of other laser sources. The LD or the LED emits a specific wavelength band of light (for example, near-infrared ray, infrared ray or visible light), and the monochromatic illumination source is configured by combining a white lamp and a monochromator. For example, the light source 10 may emit infrared light having a wavelength of 800 nm to 1,000 nm. The light emitted from the light source 10 may be modulated light which has been modulated according to a predetermined modulation characteristic (for example, frequency, wavelength, phase, modulation width or the like). FIG. 1 illustrates only one light source 10 for convenience of description, but a plurality of light sources may be arranged around the lens module 20.

The lens module 20 may collect light reflected from the target object 1 and focus the collected light on pixels PX of the pixel array 30. For example, the lens module 20 may include a focusing lens having a glass or plastic surface or another cylindrical optical element. The lens module 20 may include a plurality of lenses aligned with an optical axis.

The pixel array 30 may include a plurality of unit pixels PX which are successively arranged in a 2D matrix, for example, a plurality of unit pixels PX which are successively arranged in column and row directions. The unit pixels PX may be formed on a semiconductor substrate, and each of the unit pixels PX may convert light, incident through the lens module 20, into an electrical signal corresponding to the intensity of the light, and output the electrical signal as a pixel signal. At this time, the pixel signal may be a signal indicating the distance to the target object 1. For example, each of the unit pixels PX may be a CAPD (Current-Assisted Photonic Demodulator) pixel or QEM (Quantum Efficiency Modulation) pixel. In the present embodiment, the CAPD pixel will be taken as an example for description. However, substantially the same technical idea as the present embodiment may be applied to the QEM pixel or other pixels. The more detailed structure and operation of the unit pixel PX will be described below with reference to FIG. 3 and the following drawings.

The control block 40 may control the light source 10 to emit light onto the target object 1, and drive the unit pixels PX of the pixel array 30 to process pixel signals corresponding to light reflected from the target object 1, thereby measuring the distance to the surface of the target object 1.

Such a control block 40 may include a row driver 41, a modulation block 42, a light source driver 43, a timing controller (T/C) 44 and a readout circuit 45.

The row driver 41 and the modulation block 42 may be collectively referred to as a control circuit.

The control circuit may drive the unit pixels PX of the pixel array 30 in response to a timing signal outputted from the timing controller 44.

The control circuit may generate a control signal capable of selecting and controlling one or more row lines among a plurality of row lines of the pixel array 30. Such a control signal may include a modulation control signal for generating a pixel current within a substrate, a reset signal for controlling a reset transistor, a transfer signal for controlling transfer of photocharges accumulated in a detection node, a floating diffusion signal for providing an additional capacitance under a high luminance condition, and a selection signal for controlling a selection transistor. The pixel current may indicate a current for migrating photocharges, generated in the substrate, toward the detection node.

The row driver 41 may generate the reset signal, the transfer signal, the floating diffusion signal and the selection signal, and the modulation block 42 may generate the modulation control signal. In the present embodiment, it has been described that the row driver 41 and the modulation block 42 are independent components. In another embodiment, however, the row driver 41 and the modulation block 42 may be implemented as one component and disposed on one side of the pixel array 30.

The light source driver 43 may generate the modulated light signal MLS capable of driving the light source 10, under control of the timing controller 44. The modulated light signal MLS may be a signal which has been modulated according to a predetermined modulation characteristic (for example, frequency, wavelength, phase, modulation width or the like). The present embodiment is based on the assumption that there is no phase difference between the modulated light signal MLS and the modulated light.

The timing controller 44 may generate a timing signal for controlling the operations of the row driver 41, the modulation block 42, the light source driver 43 and the readout circuit 45.

The readout circuit 45 may generate pixel data in the form of digital signals by processing pixel signals outputted from the pixel array 30, under control of the timing controller 44. For this operation, the readout circuit 45 may include a CDS (Correlated Double Sampler) for performing correlated double sampling on the pixel signals outputted from the pixel array 30. The readout circuit 45 may include an analog-to-digital converter for converting the output signals from the CDS into digital signals. Furthermore, the readout circuit 45 may include a buffer circuit which temporarily stores pixel data outputted from the analog-digital converter and outputs the pixel data to the outside under control of the timing controller 44. As the pixel array 30 is composed of CAPD pixels, each column of the pixel array 30 may include two column lines for transferring pixel signals, and components for processing pixel signals outputted from the column lines may also be provided for the respective column lines.

The light source 10 may emit light, modulated according to a predetermined modulation characteristic (for example, frequency, wavelength, phase, modulation width or the like), toward a scene captured by the image sensing device ISD, and the image sensing device ISD may sense modulated light (i.e. incident light) reflected from target objects 1 within the scene, and generate depth information on each of the unit pixels PX. The modulated light and the incident light have a time delay therebetween, due to the distance between the image sensing device ISD and the target object 1. Such a time delay appears as a phase difference between a signal generated by the image sensing device ISD and the modulated light signal MLS for controlling the light source 10. An image processor (not illustrated) may generate a depth image containing depth information on each of the unit pixels PX by calculating a phase difference which appears in a signal outputted from the image sensing device ISD.

Figure 2:
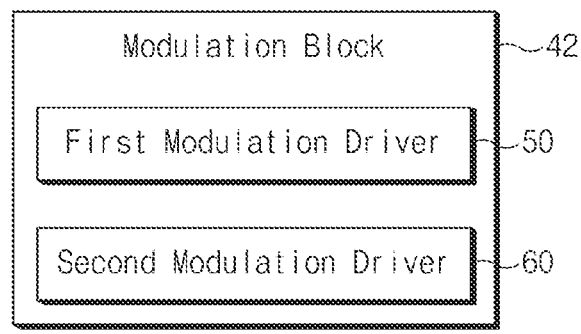
FIG. 2 is an example of a diagram for describing a structure and operation of a modulation block illustrated in FIG. 1.
Figure 2:
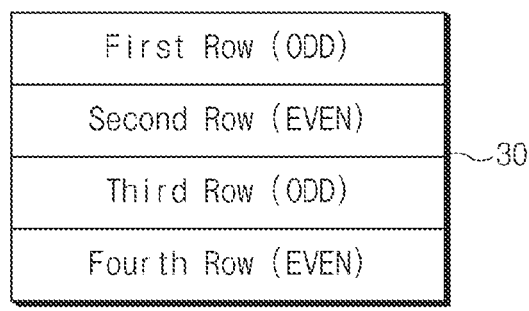

FIG. 2 is a diagram for describing the structure and operation of the modulation block illustrated in FIG. 1.

Referring to FIG. 2, the pixel array 30 may include first to fourth rows. Each of the first to fourth rows may include a plurality of pixels which are arranged in the row direction (or horizontal direction) of the pixel array 30. FIG. 2 illustrates that the pixel array 30 includes four rows. However, this configuration is an example only, and the pixel array 30 may include N number of rows, where N is a natural number other than 4.

The first to fourth rows may be divided into an odd row group ODD and an even row group EVEN according to whether each of the rows is an odd or even row. The first and third rows which are odd rows may correspond to the odd row group ODD, and the second and fourth rows which are even rows may correspond to the even row group EVEN. The odd row group ODD may include pixels included in the odd rows of the pixel array 30, and be referred to as a first pixel group. The even row group EVEN may include pixels included in the even rows of the pixel array 30, and be referred to as a second pixel group. In the present embodiment, as an example, the pixels of the pixel array 30 are either in the first pixel group or the second pixel group based on whether each of the pixels is disposed on an odd-numbered row or even-numbered row. However, other implementations are also possible to group the pixels included in the pixel array 30.

The modulation block 42 may include a first modulation driver 50 and a second modulation driver 60. The first modulation driver 50 may supply a modulation control signal to the odd row group ODD. The second modulation driver 60 may supply the modulation control signal to the even row group EVEN. The first modulation driver 50 and the second modulation driver 60 may supply modulation control signals corresponding to the odd row group ODD and the even row group EVEN, respectively. The modulation control signals corresponding to the odd row group ODD and the even row group EVEN are provided independently from each other by the first modulation driver 50 and the second modulation driver 60.

The first and second modulation drivers 50 and 60 may be controlled by the timing controller 44 such that the first and second modulation drivers 50 and 60 operate independently from each other.

The first and second modulation drivers 50 and 60 may be enabled at the same time or different times. When enabled, each of the first and second modulation drivers 50 and 60 generates the modulation control signal. In an embodiment, the first and second modulation drivers 50 and 60 may be alternately enabled. At this time, while the first modulation driver 50 is enabled, the second modulation driver 60 may be disabled. Furthermore, while the second modulation driver 60 is enabled, the first modulation driver 50 may be disabled.

The modulation control signal generated by the first modulation driver 50 and the modulation control signal generated by the second modulation driver 60 may have at least one of the same modulation characteristic (for example, frequency, wavelength, phase, modulation width or the like) or different modulation characteristics. For example, the modulation control signal generated by the first modulation driver 50 and the modulation control signal generated by the second modulation driver 60 may have different phases.

In the present embodiment, it has been described that the pixels included in the pixel array 30 are divided into two groups and the modulation block includes two modulation drivers to supply the modulation control signals to the respective groups. In accordance with another embodiment, the pixels included in the pixel array 30 may be divided into M groups, and the modulation block may include M modulation drivers to supply the modulation control signals to the respective groups, where M is an integer equal to or larger than 3.

Figure 3:
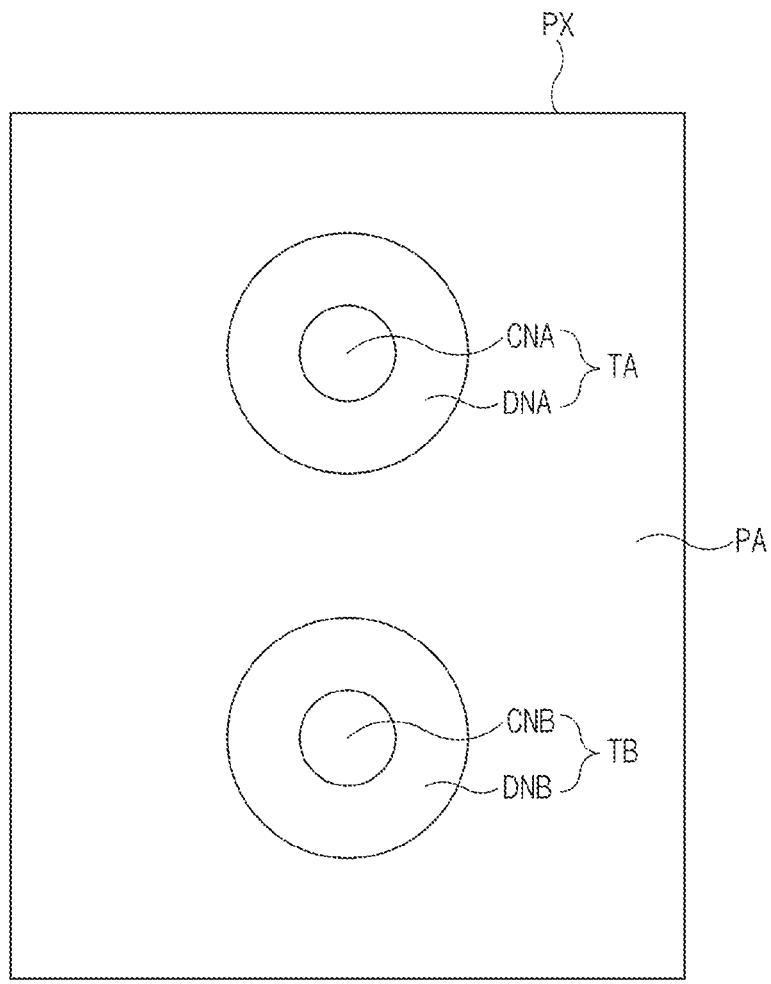
FIG. 3 is an example of a diagram illustrating a planar structure of a pixel illustrated in FIG. 1.

FIG. 3 is a diagram briefly illustrating the planar structure of a pixel illustrated in FIG. 1.

Referring to FIG. 3, a pixel PX may be any one of the pixels PX illustrated in FIG. 1.

The pixel PX may include a first tap TA, a second tap TB and a peripheral area PA. In the present disclosure, the case in which one pixel PX includes two taps TA and TB will be taken as an example for description. However, the scope of the present disclosure is not limited thereto. For example, one pixel PX may include three or more taps. In the present embodiment, each of the taps may serve to receive and output an electrical signal, and be referred to as an electrical contact tap.

FIG. 3 illustrates that the first and second taps TA and TB are arranged in a vertical direction (column direction). In another embodiment, however, the first and second taps TA and TB may be arranged in a horizontal direction (row direction) or diagonal direction.

The first tap TA may include a first control node CNA and a first detection node DNA surrounding the first control node CNA. FIG. 3 illustrates that the first control node CNA has a circular shape, and the first detection node DNA has a ring shape. However, the scope of the present disclosure is not limited thereto. The ring shape of the first detection node DNA is in order to surround the first control node CNA over as large an area as possible. The ring-shaped first detection node DNA may more easily capture signal carriers which migrate along a pixel current formed by the first control node CNA.

The first control node CNA and the first detection node DNA may be disposed to abut on each other, and physically isolated from each other by using, for example, a junction isolation through counter doping.

The second tap TB may include a second control node CNB and a second detection node DNB surrounding the second control node CNB. Since the structures of the second control node CNB and the second detection node DNB correspond to those of the first control node CNA and the first detection node DNA, the overlapping descriptions will be omitted herein.

The first and second control nodes CNA and CNB may correspond to areas doped with P-type impurities in the semiconductor substrate, and the first and second detection nodes DNA and DNB may be areas doped with N-type impurities in the semiconductor substrate. In descriptions below, the P-type may be defined as a first conductive type, and the N-type may be defined as a second conductive type.

The peripheral area PA may correspond to areas other than the first and second taps TA and TB in the pixel PX, and include a pixel transistor area PTA and a well isolation area.

The pixel transistor area PTA may include pixel transistors (TX_A, RX_A, FDX_A, DX_A and SX_A of FIG. 4) for processing photocharges captured by the first tap TA and pixel transistors (TX_B, RX_B, FDX_B, DX_B and SX_B of FIG. 4) for processing photocharges captured by the second tap TB. In an embodiment, the pixel transistors included in the pixel transistor area PTA may be disposed in a line along the boundary between pixels adjacent to each other. However, other implementations are also possible.

Each of the transistors included in the pixel transistor area PTA may include a gate configured as a gate electrode which is disposed on a dielectric layer formed on one surface of the semiconductor substrate, a source and a drain configured as impurity areas which are disposed on both sides of the gate electrode in the semiconductor substrate, and a channel area corresponding to a lower area of the gate electrode in the semiconductor substrate. The source and the drain may be surrounded by a well area doped with a predetermined concentration of P-type impurities, and the well area may be extended to the lower area of the gate electrode and thus form the body of each pixel transistor.

The well isolation area may be disposed in the pixel PX at a position in which the first and second taps TA and TB and the pixel transistor area PTA are not disposed, and electrically isolate the first and second taps TA and TB from the pixel transistor area PTA. The well isolation area may be formed through a process of forming a trench through an STI (Shallow Trench Isolation) process, and then gap-filling the trench with a dielectric material. The dielectric material may include one or more of silicon oxynitride ($Si_xO_yN_z$), silicon oxide ($Si_xO_y$), or silicon nitride ($Si_xN_y$), where x, y and z are natural numbers.

The nodes of the first and second taps TA and TB and the terminals (source and drain) of the pixel transistor area may be formed through an implant process of implanting P-type or N-type impurities at a predetermined depth and concentration.

Figure 4:
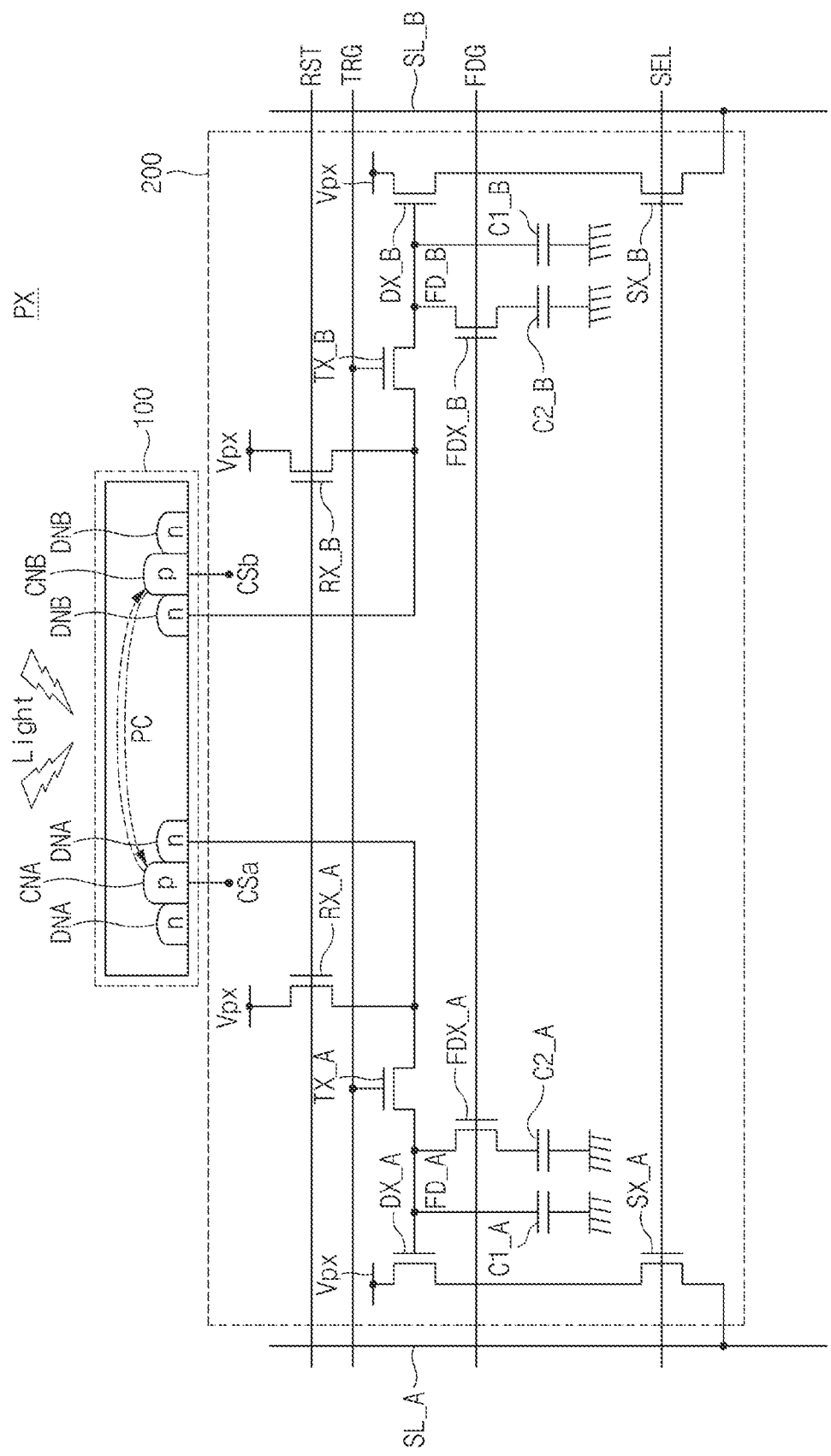
FIG. 4 is an example of a diagram for describing an operation of a pixel illustrated in FIG. 3.

FIG. 4 is a diagram for describing an operation of the pixel illustrated in FIG. 3.

Referring to FIG. 4, the pixel PX may roughly include a photoelectric conversion area 100 and a circuit area 200.

The photoelectric conversion area 100 corresponds to an area obtained by taking a cross-section of the pixel PX along a cutting line passing through the first and second taps TA and TB in FIG. 3. FIG. 4 briefly illustrates that the photoelectric conversion area 100 includes only components to directly perform a photoelectric conversion operation, among the components of the pixel PX.

The photoelectric conversion area 100 may include the first and second control nodes CNA and CNB and the first and second detection nodes DNA and DNB. The first control node CNA and the first detection node DNA may constitute the first tap TA, and the second control node CNB and the second detection node DNB may constitute the second tap TB.

The first and second control nodes CNA and CNB and the first and second detection nodes DNA and DNB may be formed in a semiconductor substrate.

The first and second control nodes CNA and CNB may receive modulation control signals CSa and CSb, respectively, from the modulation block 42. A voltage difference between the modulation control signals CSa and CSb generates a pixel current PC to control a flow of signal carriers generated in the substrate by incident light. When the voltage of the modulation control signal CSa is higher than that of the modulation control signal CSb, the pixel current PC flows from the first control node CNA to the second control node CNB. When the voltage of the modulation control signal CSa is lower than that of the modulation control signal CSb, the pixel current PC flows from the second control node CNB to the first control node CNA.

Each of the first and second detection nodes DNA and DNB may perform a function of capturing and accumulating signal carriers which migrate along the flow of the pixel current PC.

In an embodiment, a photocharge capturing operation in the photoelectric conversion area 100 may be performed over first and second capture periods, which are sequential time periods.

In the first capture period, light incident into the pixel PX may be photoelectrically converted according to the photoelectric effect, and generate electron-hole pairs corresponding to the intensity of the incident light. The electrons generated in response to the incident light represent an amount of photocharge that is proportional to the intensity of the incident light. At this time, the modulation block 42 may apply the modulation control signal CSa to the first control node CNA, and apply the modulation control signal CSb to the second control node CNB. Here, the voltage of the modulation control signal CSa may be higher than that of the modulation control signal CSb. At this time, the voltage of the modulation control signal CSa may be defined as an active voltage, and the voltage of the modulation control signal CSb may be defined as an inactive voltage. For example, the voltage of the modulation control signal CSa may be 1.2 V, and the voltage of the modulation control signal CSb may be 0 V.

Due to a voltage difference between the modulation control signals CSa and CSb, an electric field may be generated between the first and second control nodes CNA and CNB, and the pixel current PC may flow from the first control node CNA to the second control node CNB. That is, holes within the substrate may migrate toward the second control node CNB, and electrons within the substrate may migrate toward the first control node CNA.

Electrons may be generated in the substrate in response to the luminous intensity of incident light, and the generated electrons may be migrated toward the first control node CNA and captured by the first detection node DNA adjacent to the first control node CNA. Therefore, the electrons within the substrate may be used as signal carriers for detecting the luminous intensity of the incident light.

In the second capture period following the first capture period, incident light incident into the pixel PX may be photoelectrically converted according to the photoelectric effect, and generate electron-hole pairs corresponding to the intensity of the incident light. At this time, the modulation block 42 may apply the modulation control signal CSa to the first control node CNA, and apply the modulation control signal CSb to the second control node CNB. Here, the voltage of the modulation control signal CSa may be lower than that of the modulation control signal CSb. At this time, the voltage of the modulation control signal CSa may be defined as an inactive voltage, and the voltage of the modulation control signal CSb may be defined as an active voltage. For example, the voltage of the modulation control signal CSa may be 0 V, and the voltage of the modulation control signal CSb may be 1.2 V.

Due to the voltage difference between the modulation control signals CSa and CSb, an electric field may be generated between the first and second control nodes CNA and CNB, and the pixel current PC may flow from the second control node CNB to the first control node CNA. That is, holes within the substrate may migrate toward the first control node CNA, and electrons within the substrate may migrate toward the second control node CNB.

That is, electrons may be generated in the substrate in response to the luminous intensity of incident light, and the generated electrons may be migrated toward the second control node CNB and captured by the second detection node DNB adjacent to the second control node CNB. Therefore, the electrons within the substrate may be used as signal carriers for detecting the luminous intensity of the incident light.

In an embodiment, the sequence of the first and second capture periods may be changed.

Each of the modulation control signals CSa and CSb may be a modulated signal having one of first to fourth phase differences from the modulated light signal MLS. The first to fourth phase differences may be 0 (in phase), 180, 90 and 270 degrees. The modulation control signals CSa and CSb may be exactly out of phase from each other. When the modulation control signals CSa and CSb are exactly out of phase from each other, it may indicate that the modulation control signal CSb has an inactive voltage in the period where the modulation control signal CSa has an active voltage, and the modulation control signal CSb has an active voltage in the period where the modulation control signal CSa has an inactive voltage. For example, when the modulation control signal CSa has a phase difference of 0 degree from the modulated light signal MLS, the modulation control signal CSb may have a phase difference of 180 degrees from the modulated light signal MLS. Alternatively, when the modulation control signal CSa has a phase difference of 270 degrees from the modulated light signal MLS, the modulation control signal CSb may have a phase difference of 90 degrees from the modulated light signal MLS. Therefore, the modulation control signals CSa and CSb may alternatively have active voltages in the first and second capture periods.

The circuit area 200 may include a plurality of elements for converting the photocharges, captured by the first detection node DNA and the second detection node DNB, into electric signals by processing the photocharges. The circuit area 200 may include elements (e.g. transistors) disposed in the pixel transistor area and wiring lines for electrically coupling the elements in the pixel PX of FIG. 3. In the present embodiment, the circuit area 200 will be described with reference to the circuit diagram illustrated in FIG. 4, for convenience of description. Control signals RST, TRG, FDG and SEL supplied to the plurality of elements may be supplied from the row driver 41. A pixel voltage Vpx may be a supply voltage.

First, the elements for processing photocharges captured by the first detection node DNA will be described. The circuit area 200 may include a reset transistor RX_A, a transfer transistor TX_A, a first capacitor C1_A, a second capacitor C2_A, a floating diffusion transistor FDX_A, a drive transistor DX_A and a selection transistor SX_A.

The reset transistor RX_A may be activated in response to a logic high level of the reset signal RST supplied to a gate electrode thereof, and reset the potentials of a floating diffusion node FD_A and the first detection node DNA to a predetermined level (i.e. the pixel voltage Vpx). When the reset transistor RX_A is activated, the transfer transistor TX_A may be simultaneously activated to reset the floating diffusion node FD_A.

The transmission transistor TX_A may be activated in response to a logic high level of a transfer signal TRG supplied to a gate electrode thereof, and transfer the charges, accumulated in the first detection node DNA, to the floating diffusion node FD_A.

The first capacitor C1_A may be coupled to the floating diffusion node FD_A, and provide a predetermined capacitance.

The second capacitor C2_A may be selectively coupled to the floating diffusion node FD_A and provide an additional predetermined capacitance, according to the operation of the floating diffusion transistor FDX_A.

Each of the first and second capacitors C1_A and C2_A may be configured as at least one of an MIM (Metal-Insulator-Metal) capacitor, MIP (Metal-Insulator-Polysilicon) capacitor, MOS (Metal-Oxide-Semiconductor) capacitor and a junction capacitor.

The floating diffusion transistor FDX_A may be activated in response to a logic high level of a floating diffusion signal FDG supplied to a gate electrode thereof, and couple the second capacitor C2_A to the floating diffusion node FD_A.

Under a high luminance condition in which the luminous intensity of incident light is relatively high, the row driver 41 may activate the floating diffusion transistor FDX_A to couple the floating diffusion node FD_A to the second capacitor C2_A. Thus, under such a high luminance condition, the floating diffusion node FD_A can accumulate more photocharges, which makes it possible to secure a high dynamic range.

Under a low luminance condition in which the luminous intensity of incident light is relatively low, the row driver 41 may inactivate the floating diffusion transistor FDX_A to decouple the floating diffusion node FD_A and the second capacitor C2_A from each other.

In another embodiment, the floating diffusion transistor FDX_A and the second capacitor C2_A may be omitted.

The drive transistor DX_A may constitute a source follower circuit with a load MOS of a constant current source circuit CS_A coupled to one end of an output signal line SL_A, as a drain electrode thereof is coupled to the pixel voltage Vpx and a source electrode thereof is coupled to the output signal line SL_A through the selection transistor SX_A. That is, the drive transistor DX_A may output a current, corresponding to the potential of the floating diffusion node FD_A coupled to a gate electrode thereof, to the output signal line SL_A through the selection transistor SX_A.

The selection transistor SX_A may be activated in response to a logic high level of a selection signal SEL supplied to the gate electrode thereof, and output a pixel signal, outputted from the drive transistor DX_A, to the output signal line SL_A.

In order to process the photocharges captured by the second detection node DNB, the circuit area 200 may include a reset transistor RX_B, a transfer transistor TX_B, a first capacitor C1_B, a second capacitor C2_B, a floating diffusion transistor FDX_B, a drive transistor DX_B and a selection transistor SX_B. Since the elements for processing the photocharges captured by the second detection node DNB are configured and operated in the same manner as the above-described elements for processing the photocharges captured by the first detection node DNA except operation timings, the overlapping descriptions will be omitted herein.

The pixel signals outputted to the respective output signal lines SL_A and SL_B from the circuit area 200 may be converted into image data through noise removal and analog-digital conversion by the readout circuit 45.

FIG. 4 illustrates that each of the reset signal RST, the transfer signal TRG, the floating diffusion signal FDG and the selection signal SEL is supplied through one signal line. However, each of the reset signal RST, the transfer signal TRG, the floating diffusion signal FDG and the selection signal SEL may be supplied through a plurality of signal lines (for example, two signal lines) such that the elements for processing photocharges captured by the first detection node DNA and the elements for processing photocharges captured by the second detection node DNB are operated at different timings.

The image processor may calculate the phase difference between modulated light and reflected light by performing an operation on image data acquired from the photocharges captured by the first detection node DNA and image data acquired from the photocharges captured by the second detection node DNB.

In an embodiment, the image processor may calculate the phase difference between the modulated light and the reflected light, based on image data acquired from photocharges captured through the modulation control signal CSa having the first phase difference from the modulated light signal MLS, image data acquired from photocharges captured through the modulation control signal CSa having the second phase difference from the modulated light signal MLS, image data acquired from photocharges captured through the modulation control signal CSa having the third phase difference from the modulated light signal MLS, and image data acquired from photocharges captured through the modulation control signal CSa having the fourth phase difference from the modulated light signal MLS. The image sensing device ISD and the image processor may calculate the phase difference between the modulated light and the reflected light through a 4-phase modulation method. In another embodiment, the image sensing device ISD and the image processor may calculate the phase difference between the modulated light and the reflected light through a 2-phase modulation method using the modulation control signal CSa having two kinds of phase differences (e.g. the first and second phase differences) from the modulated light signal MLS.

The image processor may calculate the phase difference between the modulated light and the reflected light, based on image data acquired from photocharges captured through the modulation control signal CSb having the first phase difference from the modulated light signal MLS, image data acquired from photocharges captured through the modulation control signal CSb having the second phase difference from the modulated light signal MLS, image data acquired from photocharges captured through the modulation control signal CSb having the third phase difference from the modulated light signal MLS, and image data acquired from photocharges captured through the modulation control signal CSb having the fourth phase difference from the modulated light signal MLS.

Therefore, the image processor may calculate the phase difference between the modulated light and the reflected light based on a pixel signal of the first tap TA, and also calculate the phase difference between the modulated light and the reflected light based on a pixel signal of the second tap TB. Thus, the image processor may calculate two phase differences corresponding to one pixel PX, and decide a phase difference corresponding to the pixel PX, based on the two phase differences. For example, the image processor may decide the average value of the two phase differences as the phase difference corresponding to the pixel PX.

The image processor may calculate depth information, indicating the distance to the target object 1, from the phase difference corresponding to each pixel PX, and generate a depth image including the depth information corresponding to the pixel PX.

Figure 5:
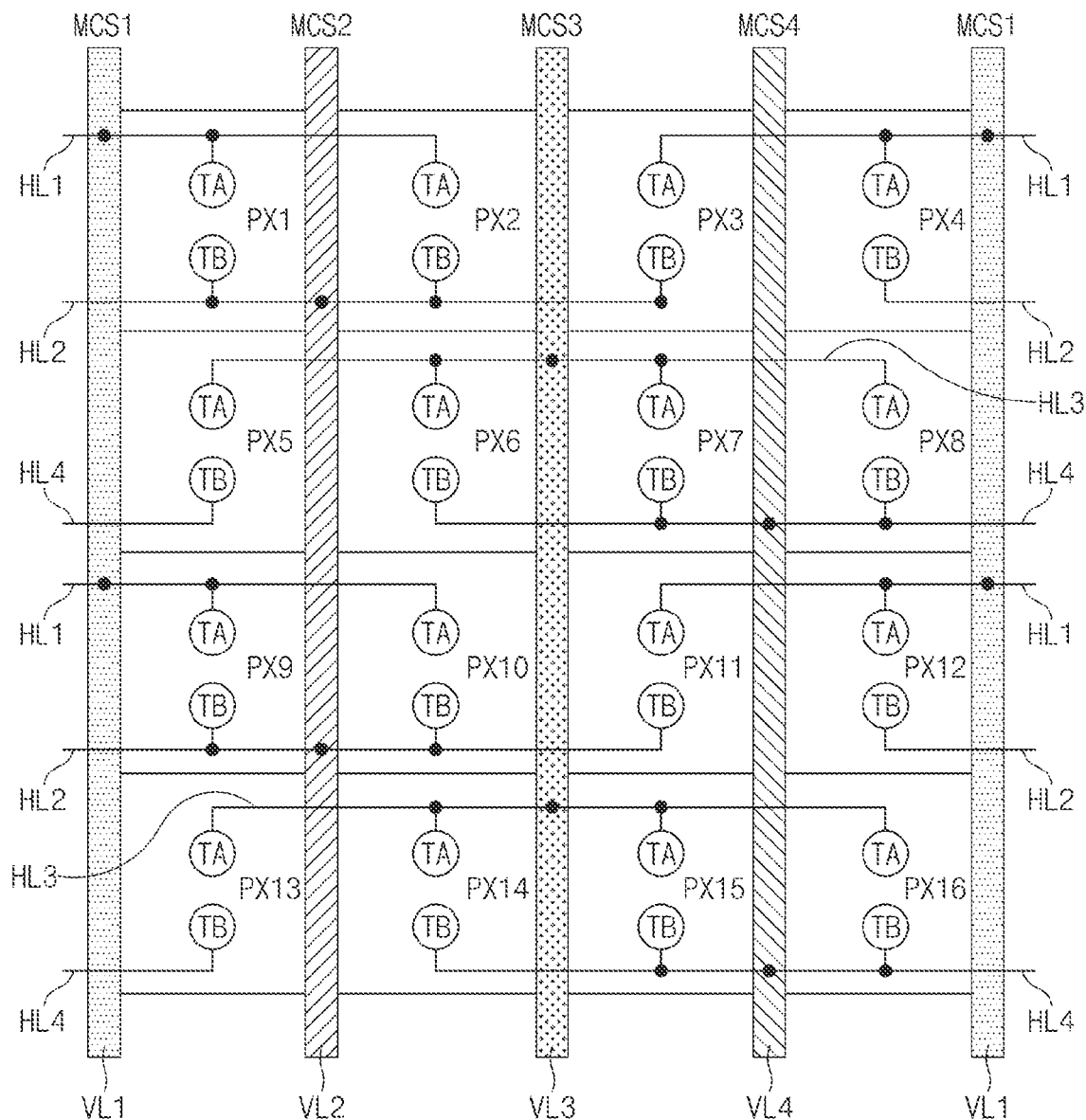
FIG. 5 is an example of a diagram for describing how a modulation block of FIG. 2 supplies modulation control signals to a pixel array.

FIG. 5 is a diagram illustrating an example of a method for supplying modulation control signals to a pixel array based on some implementations of the disclosed technology.

FIG. 5 illustrates first to 16th pixels PX1 to PX16 arranged in a matrix shape. The first row may include the first to fourth pixels PX1 to PX4, the second row may include the fifth to eighth pixels PX5 to PX8, the third row may include the ninth to 12th pixels PX9 to PX12, and the fourth row may include the 13th to 16th pixels PX13 to PX16. Each of the first to fourth columns may include four pixels (e.g. the pixels PX1, PX5, PX9 and PX13 of the first column) arranged in a column direction (vertical direction) perpendicular to a row direction (horizontal direction). FIG.

5 illustrates an example in which each of the rows and columns includes four pixels. However, each of the rows and columns may include N number of pixels, N being a natural number other than 4. When additional pixels are arranged to the pixel array as shown in FIG. 6, such additional pixels may be disposed in a matrix shape on each of the top and bottom sides and the left and right sides of the pixels PX1 to PX16 illustrated in FIG. 5.

The first modulation driver 50 may generate a first modulation control signal MCS1 and a second modulation control signal MCS2 which are supplied to pixels belonging to the first and third rows included in the odd row group ODD. The second modulation driver 60 may generate a third modulation control signal MCS3 and a fourth modulation control signal MCS4 which are supplied to pixels belonging to the second and fourth rows included in the even row group EVEN.

On the left and right sides of each column, vertical signal lines (e.g. VL1, VL2, VL3 and VL4) for transferring the modulation control signal outputted from the first or second modulation driver 50 or 60 may be disposed. Some of the vertical signal lines (e.g. VL2, VL3, VL4) may be disposed between two adjacent columns.

In the present embodiment, since the first and second modulation drivers 50 and 60 are located at the top of the pixel array 30, the vertical signal lines VL1 to VL4 may be extended in the column direction. First to fourth vertical signal lines VL1 to VL4 may be sequentially disposed in the row direction, and the first to fourth vertical signal lines VL1 to VL4 forming another signal line group may be repeatedly disposed on the left or right side of the first to fourth vertical signal lines VL1 to VL4.

The first and second modulation drivers 50 and 60 may generate the first to fourth modulation control signals MCS1 to MCS4 and supply the generated first to fourth modulation control signals MCS1 to MCS4 to the pixel array 30, and the vertical signal lines VL1 to VL4 may transfer the first to fourth modulation control signals MCS1 to MCS4, respectively.

At each row, two horizontal signal lines for transferring the modulation control signals outputted from the first and second modulation driver 50 and 60 may be disposed. For example, two horizontal signal lines, HL1 and HL2, are disposed at the first row to transfer the modulation control signals outputted from the first and second modulation driver 50 and 60.

First to fourth horizontal signal lines HL1 to HL4 may be sequentially disposed in the column direction, and the first to fourth horizontal signal lines HL1 to HL4 forming another signal line group may be repeatedly disposed on the top or bottom side of the first to fourth horizontal signal lines HL1 to HL4.

The horizontal signal lines HL1 to HL4 may be electrically coupled to the respective vertical signal lines VL1 to VL4, and transfer the first to fourth modulation control signals MCS1 to MCS4, respectively.

Each of the horizontal signal lines HL1 to HL4 may be extended in the row direction. The horizontal signal lines disposed at any one row may not be formed as one integral line electrically coupled to all the pixels of the one row, but be separated in predetermined units and the horizontal signal lines corresponding to the predetermined units may be repeatedly disposed in the row direction. The horizontal signal lines HL1 to HL4 may be disposed to overlap each other, while having a length corresponding to a predetermined number of pixels (four pixels in FIG. 5) arranged in the row direction, and each physically isolated from the horizontal signal line disposed on the left or right side of the corresponding horizontal signal line. This is in order to minimize the generation of noise by an IR drop by limiting the range of pixels, to which one vertical signal line supplies the modulation control signal, to pixels belonging to two left columns and two right columns around the vertical signal line.

Each of the first to 16th pixels PX1 to PX16 may include a first tap TA and a second tap TB.

The first taps TA of the pixels belonging to the first and third rows set to the odd row group ODD may receive the first modulation control signal MCS1 through the first vertical signal line VL1 and the first horizontal signal line HL1. The second taps TB of the pixels belonging to the first and third rows set to the odd row group ODD may receive the second modulation control signal MCS2 through the second vertical signal line VL2 and the second horizontal signal line H L2.

The first taps TA of the pixels belonging to the second and fourth rows set to the even row group EVEN may receive the third modulation control signal MCS3 through the third vertical signal line VL3 and the third horizontal signal line HL3. The second taps TB of the pixels belonging to the second and fourth rows set to the even row group EVEN may receive the fourth modulation control signal MCS4 through the fourth vertical signal line VL4 and the fourth horizontal signal line HL4.

FIGS. 6A to 6D are diagrams illustrating examples of modulation control signals generated by a modulation block based on some implementations of the disclosed technology.

FIGS. 6A to 6D illustrate first to fourth modulation periods MP1 to MP4, respectively, which may constitute a first phase difference detection period for detecting the phase difference between modulated light and reflected light. The modulation period may be defined as a time period in which each of the first to fourth modulation control signals MCS1 to MCS4 maintains a constant waveform. The constant waveform may indicate a waveform having a constant modulation characteristic (e.g. phase difference) or a waveform having a constant voltage level (e.g. logic low level). The first to fourth modulation control signals MCS1 to MCS4 may each have a logic high level H or logic low level L, and the logic high level H and the logic low level L may indicate the active voltage and the inactive voltage, respectively, which have been described above.

Figure 6A:
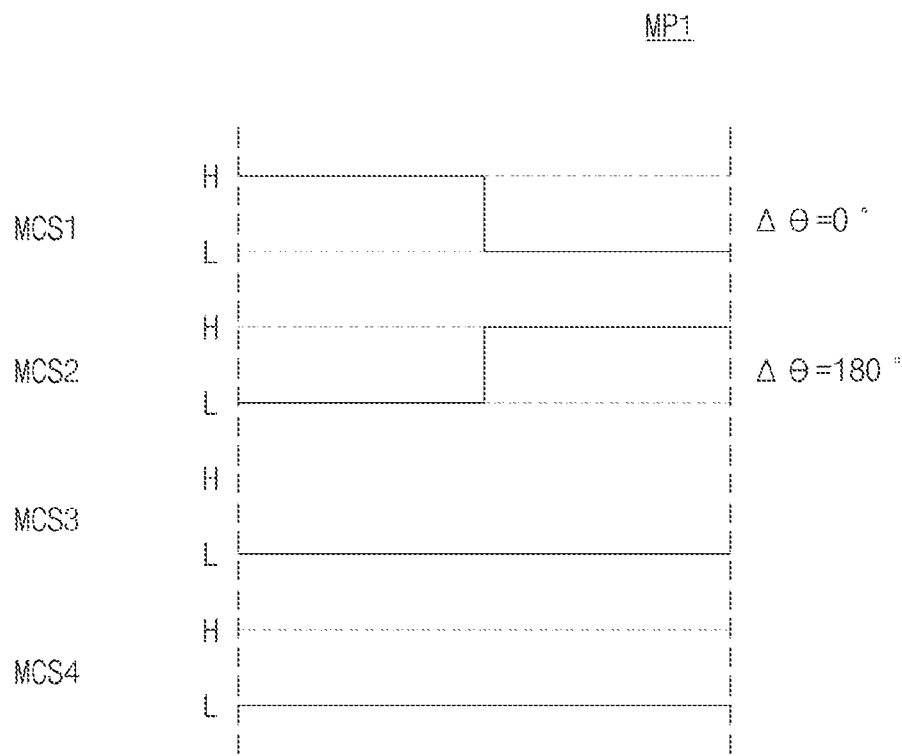
FIGS. 6A to 6D are diagrams illustrating examples of modulation control signals generated by a modulation block based on some implementations of the disclosed technology.

In the first modulation period MP1 illustrated in FIG. 6A, the first modulation control signal MCS1 may have a phase difference of 0 degree from the modulated light signal MLS, the second modulation control signal MCS2 may have a phase difference of 180 degrees from the modulated light signal MLS, and the third and fourth modulation control signals MCS3 and MCS4 may constantly have the logic low level L. That is, in the first modulation period MP1, the first modulation driver 50 may be activated, and the second modulation driver 60 may be inactivated. As the first modulation control signal MCS1 having a phase difference of 0 degree from the modulated light signal MLS is applied to the first tap TA of the odd row group ODD, first image data for the first tap TA of the odd row group ODD may be generated, the first image data indicating image data acquired from photocharges captured through the modulation control signal having a phase difference of 0 degree from the modulated light signal MLS. Furthermore, as the second modulation control signal MCS2 having a phase difference of 180 degrees from the modulated light signal MLS is applied to the second tap TB of the odd row group ODD, second image data for the second tap TB of the odd row group ODD may be generated, the second image data indicating image data acquired from photocharges captured through the modulation control signal having a phase difference of 180 degrees from the modulated light signal MLS.

Figure 6B:
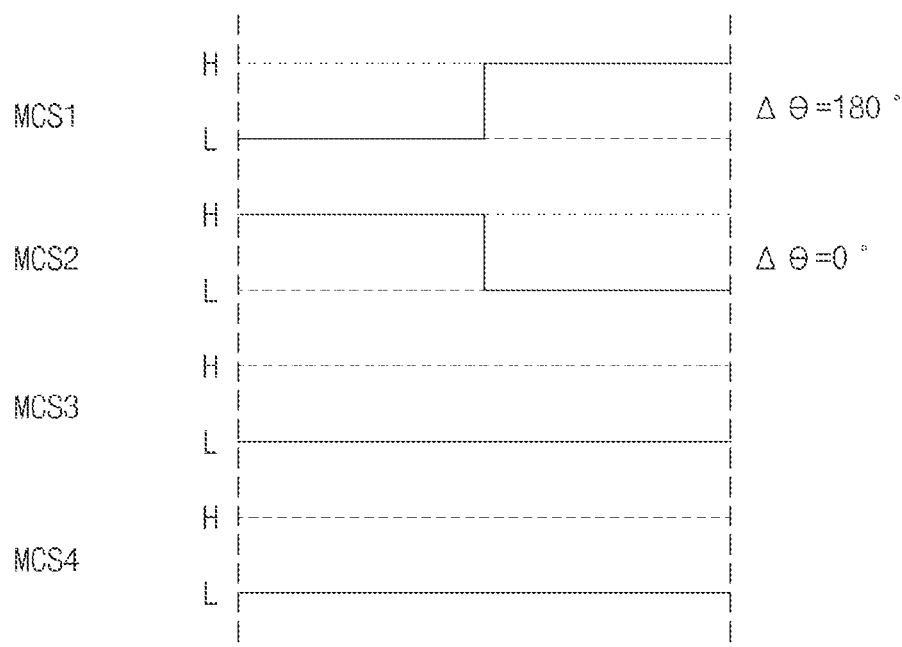

In the second modulation period MP2 illustrated in FIG. 6B, the first modulation control signal MCS1 may have a phase difference of 180 degrees from the modulated light signal MLS, the second modulation control signal MCS2 may have a phase difference of 0 degree from the modulated light signal MLS, and the third and fourth modulation control signals MCS3 and MCS4 may constantly have the logic low level L. That is, in the second modulation period MP2, the first modulation driver 50 may be activated, and the second modulation driver 60 may be inactivated. As the first modulation control signal MCS1 having a phase difference of 180 degrees from the modulated light signal MLS is applied to the first tap TA of the odd row group ODD, the second image data for the first tap TA of the odd row group ODD may be generated. Furthermore, as the second modulation control signal MCS2 having a phase difference of 0 degree from the modulated light signal MLS is applied to the second tap TB of the odd row group ODD, the first image data for the second tap TB of the odd row group ODD may be generated.

Figure 6C:
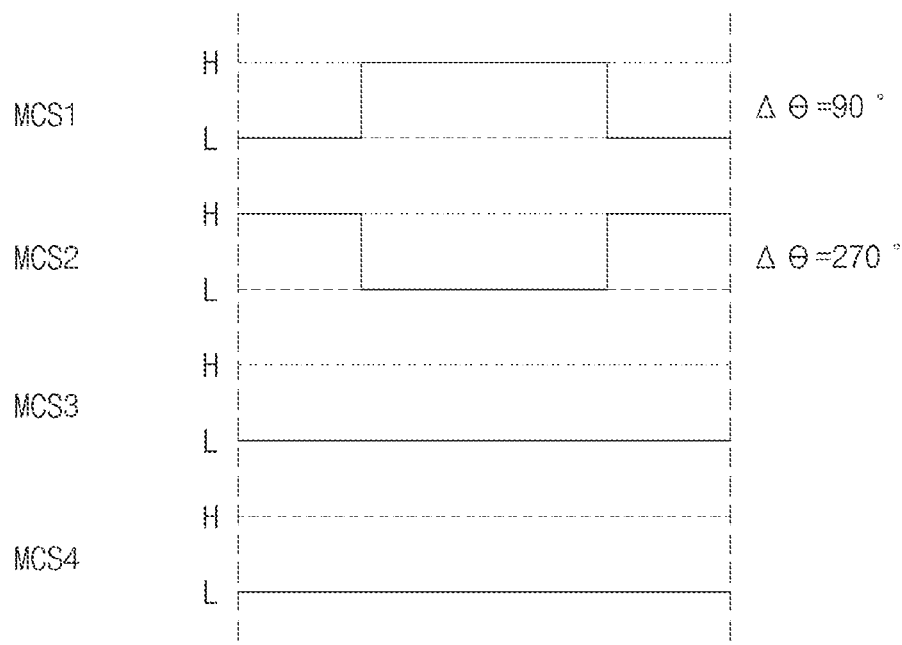

In the third modulation period MP3 illustrated in FIG. 6C, the first modulation control signal MCS1 may have a phase difference of 90 degrees from the modulated light signal MLS, the second modulation control signal MCS2 may have a phase difference of 270 degrees from the modulated light signal MLS, and the third and fourth modulation control signals MCS3 and MCS4 may constantly have the logic low level L. That is, in the third modulation period MP3, the first modulation driver 50 may be activated, and the second modulation driver 60 may be inactivated. As the first modulation control signal MCS1 having a phase difference of 90 degrees from the modulated light signal MLS is applied to the first tap TA of the odd row group ODD, third image data for the first tap TA of the odd row group ODD may be generated, the third image data indicating image data acquired from photocharges captured through the modulation control signal having a phase difference of 90 degrees from the modulated light signal MLS. Furthermore, as the second modulation control signal MCS2 having a phase difference of 270 degrees from the modulated light signal MLS is applied to the second tap TB of the odd row group ODD, fourth image data for the second tap TB of the odd row group ODD may be generated, the fourth image data indicating image data acquired from photocharges captured through the modulation control signal having a phase difference of 270 degrees from the modulated light signal MLS.

Figure 6D:
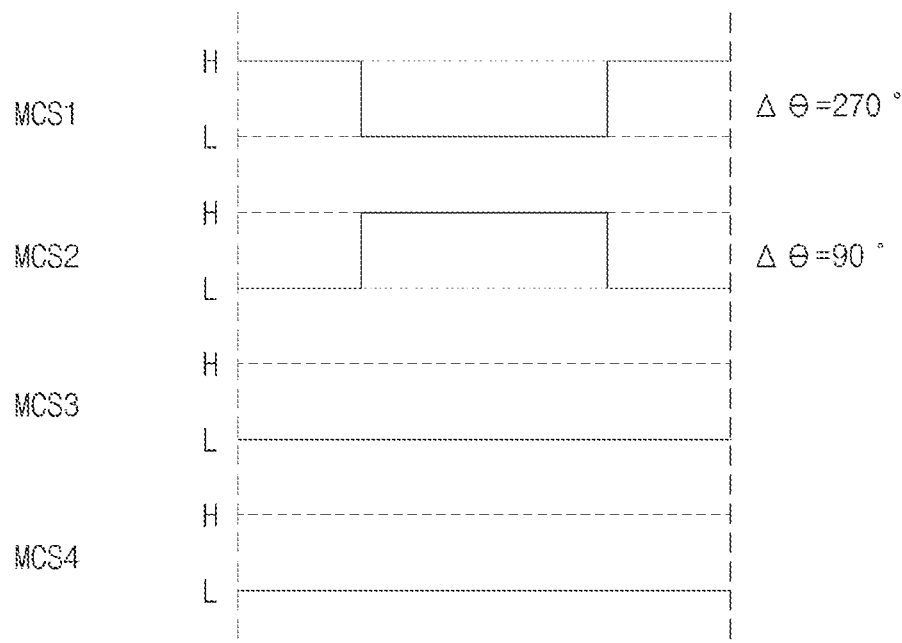

In the fourth modulation period MP4 illustrated in FIG. 6D, the first modulation control signal MCS1 may have a phase difference of 270 degrees from the modulated light signal MLS, the second modulation control signal MCS2 may have a phase difference of 90 degrees from the modulated light signal MLS, and the third and fourth modulation control signals MCS3 and MCS4 may constantly have the logic low level L. That is, in the fourth modulation period MP4, the first modulation driver 50 may be activated, and the second modulation driver 60 may be inactivated. As the first modulation control signal MCS1 having a phase difference of 270 degrees from the modulated light signal MLS is applied to the first tap TA of the odd row group ODD, the fourth image data for the first tap TA of the odd row group ODD may be generated. Furthermore, as the second modulation control signal MCS2 having a phase difference of 90 degrees from the modulated light signal MLS is applied to the second tap TB of the odd row group ODD, the third image data for the second tap TB of the odd row group ODD may be generated.

The image processor may calculate the phase difference between the modulated light and the reflected light based on the first to fourth image data for the first tap TA, and calculate the phase difference between the modulated light and the reflected light based on the first to fourth image data for the second tap TB.

According to the method for generating the modulation control signals illustrated in FIGS. 6A to 6D, the second modulation driver 60 may be inactivated, and the pixels (i.e. even row group EVEN) coupled to the second modulation driver 60 may also be inactivated. In an embodiment, in the first to fourth modulation periods MP1 to MP4, the control signals (e.g. the reset signal, the transfer signal and the selection signal) other than the modulation control signal may not be supplied to the pixels coupled to the second modulation driver 60. Thus, compared to the case in which the pixels of the pixel array 30 are simultaneously activated, the number of pixels which are simultaneously activated may be decreased to reduce power consumption required for driving the pixel array 30.

In the embodiment of FIGS. 6A to 6D, however, the first and second modulation control signals MCS1 and MCS2 are signals applied to the first and second taps TA and TB of the pixels included in the odd row group ODD. Thus, image data may be generated only for the pixels of the odd row group ODD. Therefore, in order to acquire image data for the pixels of the even row group EVEN, the first modulation driver 50 may be inactivated, and the second modulation driver 60 may be activated, so that the first modulation control signal MCS1 and the third modulation control signal MCS3 are exchanged and the second modulation control signal MCS2 and the fourth modulation control signal MCS4 are exchanged.

Figure 7A:
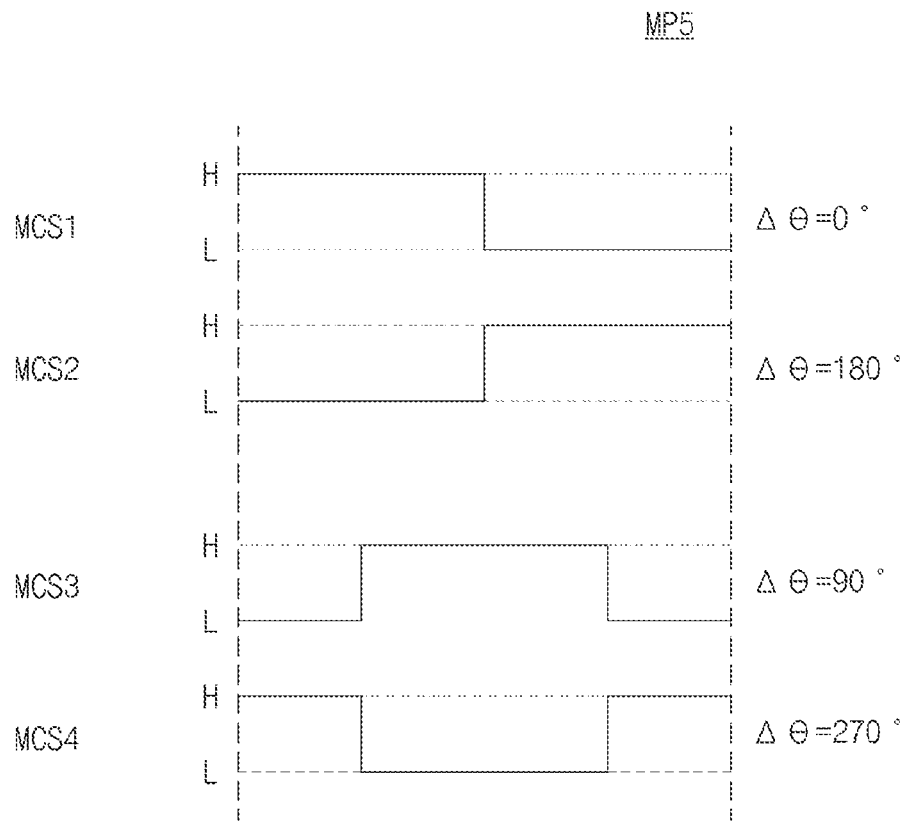
FIGS. 7A and 7B are diagrams illustrating examples of modulation control signals generated by a modulation block based on some implementations of the disclosed technology.
Figure 7B:
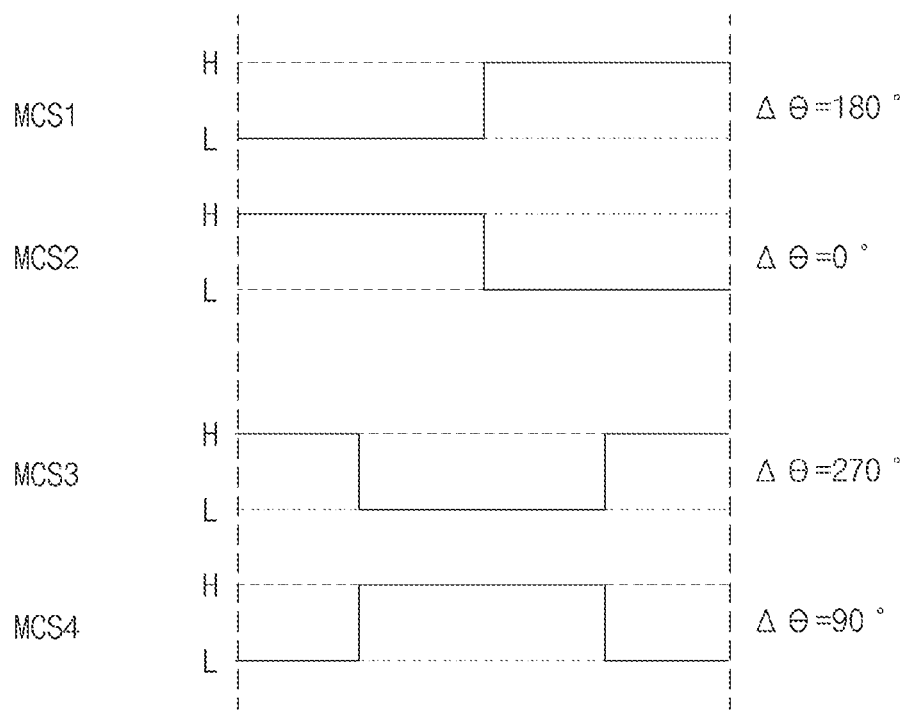

FIGS. 7A and 7B are diagrams illustrating another example of the modulation control signals generated by the modulation block.

FIGS. 7A and 7B illustrate fifth and sixth modulation periods MP5 and MP6, respectively, which may constitute a second phase difference detection period for detecting the phase difference between modulated light and reflected light.

In the fifth modulation period MP5 illustrated in FIG. 7A, the first modulation control signal MCS1 may have a phase difference of 0 degree from the modulated light signal MLS, the second modulation control signal MCS2 may have a phase difference of 180 degrees from the modulated light signal MLS, the third modulation control signal MCS3 may have a phase difference of 90 degrees from the modulated light signal MLS, and the fourth modulation control signal MCS4 may have a phase difference of 270 degrees from the modulated light signal MLS. That is, in the fifth modulation period MP5, the first modulation driver 50 and the second modulation driver 60 may be activated at the same time. As the first modulation control signal MCS1 having a phase difference of 0 degree from the modulated light signal MLS is applied to the first tap TA of the odd row group ODD, first image data for the first tap TA of the odd row group ODD may be generated. Furthermore, as the second modulation control signal MCS2 having a phase difference of 180 degrees from the modulated light signal MLS is applied to the second tap TB of the odd row group ODD, second image data for the second tap TB of the odd row group ODD may be generated. As the third modulation control signal MCS3 having a phase difference of 90 degrees from the modulated light signal MLS is applied to the first tap TA of the even row group EVEN, third image data for the first tap TA of the even row group EVEN may be generated. As the fourth modulation control signal MCS4 having a phase difference of 270 degrees from the modulated light signal MLS is applied to the second tap TB of the even row group EVEN, fourth image data for the second tap TB of the even row group EVEN may be generated.

In the sixth modulation period MP6 illustrated in FIG. 7B, the first modulation control signal MCS1 may have a phase difference of 180 degrees from the modulated light signal MLS, the second modulation control signal MCS2 may have a phase difference of 0 degree from the modulated light signal MLS, the third modulation control signal MCS3 may have a phase difference of 270 degrees from the modulated light signal MLS, and the fourth modulation control signal MCS4 may have a phase difference of 90 degrees from the modulated light signal MLS. That is, in the sixth modulation period MP6, the first modulation driver 50 and the second modulation driver 60 may be activated at the same time. As the first modulation control signal MCS1 having a phase difference of 180 degrees from the modulated light signal MLS is applied to the first tap TA of the odd row group ODD, the second image data for the first tap TA of the odd row group ODD may be generated. Furthermore, as the second modulation control signal MCS2 having a phase difference of 0 degree from the modulated light signal MLS is applied to the second tap TB of the odd row group ODD, the first image data for the second tap TB of the odd row group ODD may be generated. As the third modulation control signal MCS3 having a phase difference of 270 degrees from the modulated light signal MLS is applied to the first tap TA of the even row group EVEN, the fourth image data for the first tap TA of the even row group EVEN may be generated. As the fourth modulation control signal MCS4 having a phase difference of 90 degrees from the modulated light signal MLS is applied to the second tap TB of the even row group EVEN, the third image data for the second tap TB of the even row group EVEN may be generated.

In the method for generating the modulation control signals illustrated in FIGS. 7A and 7B, one pixel (e.g. PX1 of FIG. 5) belonging to the odd row group ODD and one pixel (e.g. PX5 of FIG. 5) belonging to the even row group EVEN adjacent to the pixel may be treated as one pixel.

Therefore, the image processor may calculate the phase difference between the modulated light and the reflected light based on the first to fourth image data for the first taps TA of the pixel group, and calculate the phase difference between the modulated light and the reflected light based on the first to fourth image data for the second taps TB of the pixel group.

According to the method for generating the modulation control signals illustrated in FIGS. 7A and 7B, the first and second modulation drivers 50 and 60 may be activated at the same time, and the modulation control signals having different phase differences may be applied to two pixels belonging to the pixel group, respectively. Thus, the first to fourth image data for the first or second tap TA or TB of the pixel group may be acquired through the two modulation periods, which makes it possible to improve the speed at which the distance to the target object 1 is calculated, and to reduce the power consumption.

FIGS. 8A to 8D are diagrams illustrating still another example of the modulation control signals generated by the modulation block.

FIGS. 8A to 8D illustrate seventh to tenth modulation periods MP7 to MP10, respectively, which may constitute a third phase difference detection period for detecting the phase difference between modulated light and reflected light.

In the third phase difference detection period, the first and second modulation drivers 50 and 60 may be alternately activated.

Figure 8A:
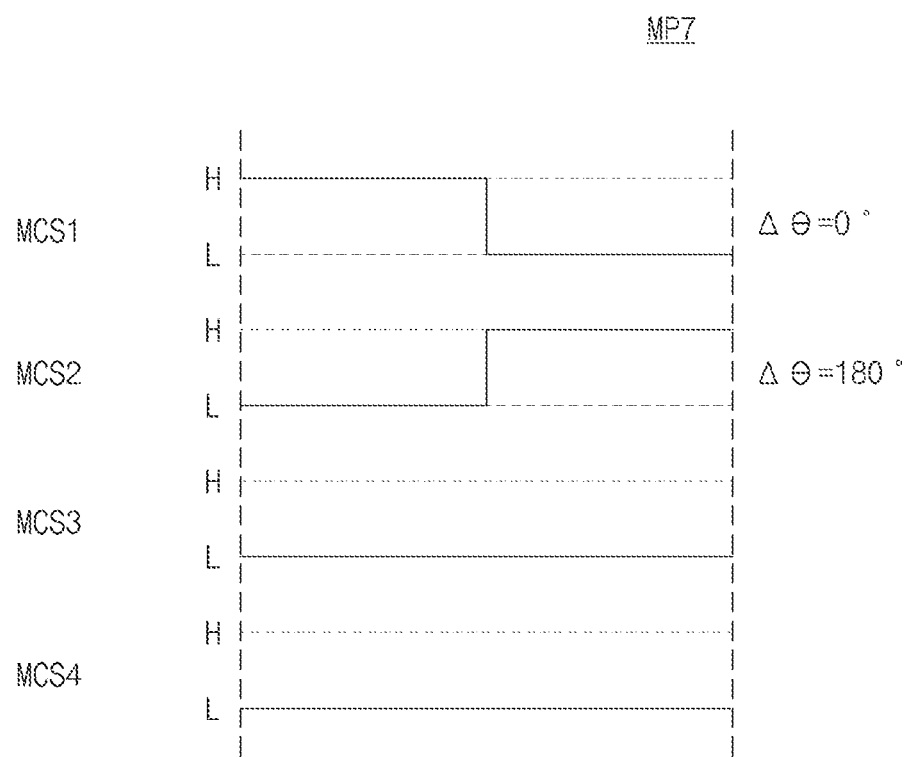
FIGS. 8A to 8D are diagrams illustrating examples of modulation control signals generated by a modulation block based on some implementations of the disclosed technology.
Figure 8B:
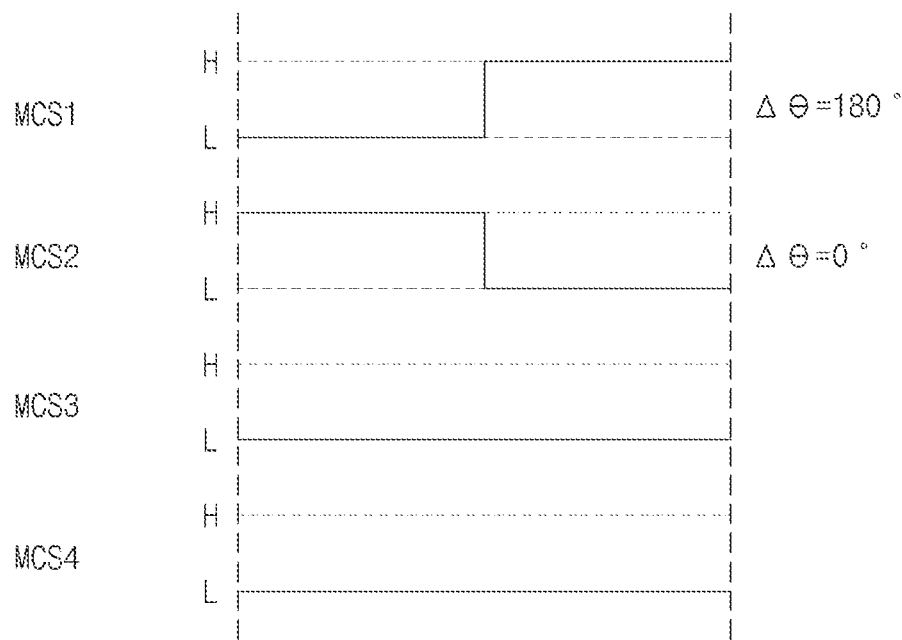

Since the seventh modulation period MP7 illustrated in FIG. 8A and the eighth modulation period MP8 illustrated in FIG. 8B are substantially the same as the first modulation period MP1 illustrated in FIG. 6A and the second modulation period MP2 illustrated in FIG. 6B, respectively, the overlapping descriptions thereof will be omitted herein.

Figure 8C:
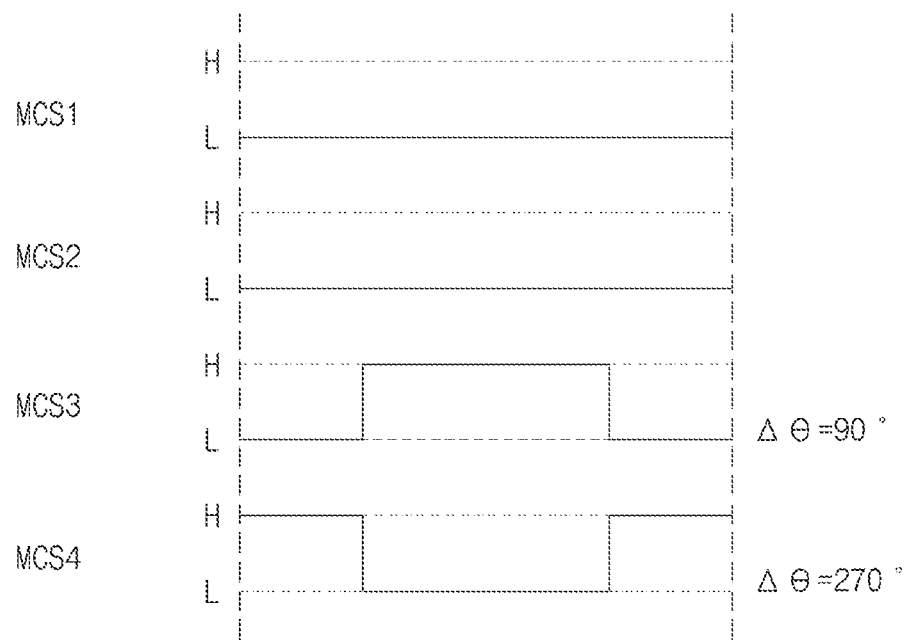

In the ninth modulation period MP9 illustrated in FIG. 8C, the first and second modulation control signals MCS1 and MCS2 may constantly have the logic low level L, the third modulation control signal MCS3 may have a phase difference of 90 degrees from the modulated light signal MLS, and the fourth modulation control signal MCS4 may have a phase difference of 270 degrees from the modulated light signal MLS. That is, in the ninth modulation period MP9, the first modulation driver 50 may be inactivated, and the second modulation driver 60 may be activated. As the third modulation control signal MCS3 having a phase difference of 90 degrees from the modulated light signal MLS is applied to the first tap TA of the even row group EVEN, the third image data for the first tap TA of the even row group EVEN may be generated. Furthermore, as the fourth modulation control signal MCS4 having a phase difference of 270 degrees from the modulated light signal MLS is applied to the second tap TB of the even row group EVEN, the fourth image data for the second tap TB of the even row group EVEN may be generated.

Figure 8D:
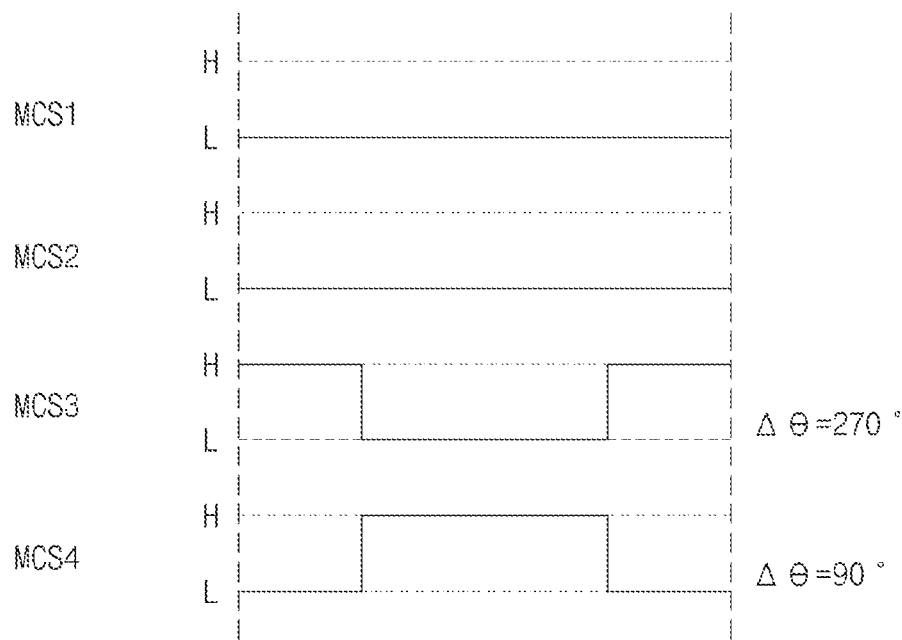

In the tenth modulation period MP10 illustrated in FIG. 8D, the first and second modulation control signals MCS1 and MCS2 may constantly have the logic low level L, the third modulation control signal MCS3 may have a phase difference of 270 degrees from the modulated light signal MLS, and the fourth modulation control signal MCS4 may have a phase difference of 90 degrees from the modulated light signal MLS. That is, in the tenth modulation period MP10, the first modulation driver 50 may be inactivated, and the second modulation driver 60 may be activated. As the third modulation control signal MCS3 having a phase difference of 270 degrees from the modulated light signal MLS is applied to the first tap TA of the even row group EVEN, the fourth image data for the first tap TA of the even row group EVEN may be generated. Furthermore, as the fourth modulation control signal MCS4 having a phase difference of 90 degrees from the modulated light signal MLS is applied to the second tap TB of the even row group EVEN, the third image data for the second tap TB of the even row group EVEN may be generated.

In the method for generating the modulation control signals illustrated in FIGS. 8A to 8D, one pixel (e.g. PX1 of FIG. 5) belonging to the odd row group ODD and one pixel (e.g. PX5 of FIG. 5) belonging to the even row group EVEN adjacent to the pixel may be treated as one pixel.

Therefore, the image processor may calculate the phase difference between the modulated light and the reflected light based on the first to fourth image data for the first taps TA of the pixel group, and calculate the phase difference between the modulated light and the reflected light based on the first to fourth image data for the second taps TB of the pixel group.

According to the method for generating the modulation control signals illustrated in FIGS. 8A to 8D, the second modulation driver 60 and the first modulation driver 50 may be sequentially inactivated, and the pixels (i.e. the even row group EVEN) coupled to the second modulation driver 60 and the pixels (i.e. the odd row group ODD) coupled to the first modulation driver 50 may also be sequentially inactivated. In an embodiment, the control signals other than the modulation control signals may be neither supplied to the pixels, coupled to the second modulation driver 60, in the seventh and eighth modulation periods MP7 and MP8, nor supplied to the pixels, coupled to the first modulation driver 50, in the ninth and tenth modulation periods MP9 and MP10. Thus, compared to the case in which the pixels of the pixel array 30 are simultaneously activated, the number of pixels which are simultaneously activated may be decreased to reduce power consumption required for driving the pixel array 30.

While various embodiments have been described above, variations and improvements of the disclosed embodiments and other embodiments may be made based on what is described or illustrated in this document.

What is claimed is:

1. An image sensing device comprising:
   a pixel array comprising a first pixel group and a second pixel group, each of the first pixel group and the second pixel group including pixels each configured to sense a distance to a target object in response to modulated light that is incident on the pixel array;
   a first modulation driver communicatively coupled to the pixel array and configured to supply, to the first pixel group, a first modulation control signal and a second modulation control signal; and
   a second modulation driver communicatively coupled to the pixel array and configured to supply, to the second pixel group, a third modulation control signal and a fourth modulation control signal,
   wherein the first and second modulation drivers are independently controlled from each other such that at least one of the first modulation control signal, the second modulation control signal, the third modulation control signal, or the fourth modulation control signal has a phase difference from the modulated light.

2. The image sensing device of claim 1, further comprising: a controller communicatively coupled to the first modulation driver and the second modulation driver and configured to control activation of the first modulation driver and the second modulation driver independently.

3. The image sensing device of claim 1, wherein a phase difference between the first modulation control signal and the modulated light is different from a phase difference between the third modulation control signal and the modulated light, and
   a phase difference between the second modulation control signal and the modulated light is different from a phase difference between the fourth modulation control signal and the modulated light.

4. The image sensing device of claim 1, wherein the first modulation driver is activated and the second modulation driver is inactivated in a first phase difference detection period for detecting a phase difference between the modulated light and reflected light that is incident by reflecting the modulated light from the target object.

5. The image sensing device of claim 4, wherein the first modulation driver is configured in the first phase difference detection period to generate the first modulation control signal and the second modulation control signal to have a first phase difference and a second phase difference from the modulated light, respectively.

6. The image sensing device of claim 5, wherein the first phase difference is different from the second phase difference by 180 degrees.

7. The image sensing device of claim 1, wherein the first modulation driver is activated and the second modulation driver is activated in a second phase difference detection period for detecting a phase difference between the modulated light and reflected light that is incident by reflecting the modulated light from the target object.

8. The image sensing device of claim 7, wherein the first modulation driver and the second modulation driver are configured in the second phase difference detection period to generate the first modulation control signal to the fourth modulation control signal to have a first phase difference, a second phase difference, a third phase difference and a fourth phase difference from the modulated light, respectively.

9. The image sensing device of claim 8, wherein the first phase difference is different from the second phase difference by 180 degrees and the third phase difference is different from the fourth phase difference by 180 degrees.

10. The image sensing device of claim 9, wherein the first phase difference is different from the third phase difference by 90 degrees and the second phase difference is different from the fourth phase difference by 90 degrees.

11. The image sensing device of claim 1, wherein the first modulation driver and the second modulation driver are alternately activated in a third phase difference detection period for detecting a phase difference between the modulated light and reflected light that is incident by reflecting the modulated light from the target object.

12. The image sensing device of claim 11, wherein the first modulation driver is configured, upon beings activated, to generate the first modulation control signal and the second modulation control signal to have a first phase difference and a second phase difference from the modulated light, respectively, and
   wherein the second modulation driver is configured, upon being activated, to generate the third modulation control signal and the fourth modulation control signal to have a third phase difference and a fourth phase difference from the modulated light, respectively.

13. The image sensing device of claim 12, wherein the first phase difference is different from the second phase difference by 180 degrees, and
   wherein the third phase difference is different from the fourth phase difference by 180 degrees.

14. The image sensing device of claim 1, wherein each pixel comprises a first detection structure and a second detection structure that are configured to generate a current that carries photocharges generated in response to the modulated light,
   wherein the first detection structure is configured to receive the first or third modulation control signal, and the second detection structure is configured to receive the second or fourth modulation control signal.

15. The image sensing device of claim 14, wherein the first and second modulation drivers are respectively coupled to the first and second detection structures to supply corresponding modulation control signals through a vertical signal line extended in a column direction of the pixel array and a horizontal signal line extended in a row direction of the pixel array.

16. The image sensing device of claim 15, wherein the horizontal signal line has a length corresponding to a preset number of pixels.

17. The image sensing device of claim 1, wherein the first pixel group comprises pixels included in N-th rows of the pixel array, and the second pixel group comprises pixels included in M-th rows of the pixel array, N and M being an odd natural number and an even natural number, respectively.

18. An image sensing device comprising:
a pixel array comprising a first pixel disposed in a first pixel group and a second pixel disposed in a second pixel group, each pixel configured to sense a distance to a target object by responding to incident light and producing photocharges and including a first detection structure and a second detection structure that are configured to capture the photocharges migrated by a current generated in the pixel array;
a first modulation driver in communication with the pixel array and configured to supply a first modulation control signal and a second modulation control signal to the first detection structure and the second detection structure of the first pixel, respectively; and
a second modulation driver in communication with the pixel array and configured to supply a third modulation control signal and a fourth modulation control signal to the first detection structure and the second detection structure of the second pixel, respectively, wherein at least two of the first to fourth modulation control signal have different phases from each other.

19. The image sensing device of claim 18, wherein the first modulation driver and the second modulation driver are configured to operate at different times.

20. The image sensing device of claim 18, wherein the first pixel group includes pixels that are arranged in N-th rows of the pixel array, and the second pixel group comprises pixels included in M-th rows of the pixel array, N and M being an odd natural number and an even natural number, respectively.

* * * * *